United States Patent [19]

Stanley

[11] Patent Number: 5,046,219
[45] Date of Patent: Sep. 10, 1991

[54] PREPACKAGED SHIRRED FOOD EMULSION CASING WITH INTEGRAL CASING SIZING AND BRAKE CONTROL

[75] Inventor: Thomas R. Stanley, Kansas City, Mo.

[73] Assignee: Teepak, Inc., Westchester, Ill.

[21] Appl. No.: 570,666

[22] Filed: Aug. 22, 1990

[51] Int. Cl.⁵ .............................................. A22C 21/00
[52] U.S. Cl. .................................... 452/30; 53/576; 138/118.1; 452/21
[58] Field of Search ............... 17/49, 41, 41.2, 42, 17/1 R, 35; 53/576; 138/118.1; 206/802; 426/138, 140, 277

[56] References Cited

U.S. PATENT DOCUMENTS

| | | | |
|---|---|---|---|
| 3,471,305 | 10/1969 | Marbach | 138/118.1 |
| 4,033,382 | 7/1977 | Epchin | 138/118.1 |
| 4,292,711 | 10/1981 | Becker | 17/49 |
| 4,590,830 | 5/1986 | Duroyon et al. | 17/49 |
| 4,649,602 | 3/1987 | Kupcikevicius | 17/49 |

Primary Examiner—Willis Little
Attorney, Agent, or Firm—R. Lawrence Sahr; Michael L. Dunn; Robert P. Simpson

[57] ABSTRACT

The shirred casing disclosed is packaged in a plastic tube with the lead end of that tube formed into a combined brake/size means which applies oblique frictional force and variable size control to the food emulsion as it is being extruded into the case; also disclosed are means for permitting gas pressure build-up to be relieved and the gas to escape.

20 Claims, 5 Drawing Sheets

PREPACKAGED SHIRRED FOOD EMULSION CASING WITH INTEGRAL CASING SIZING AND BRAKE CONTROL

FIELD OF THE INVENTION

The present invention relates generally to the packaging of food emulsion products, particularly to those which are packed in casing materials and specifically to the prepackaging of shirred casing materials such that both size and brake control functions may be exercised by manipulation, of the prepackaging in relation to the casing material, to control the size and consistency of the food emulsion which is stuffed into that casing.

BACKGROUND OF THE INVENTION

In the manufacture of food emulsion products, e.g. sausage or frankfurters, a tubular food casing such as regenerated cellulose or collagen is loaded onto the stuffing horn of a filling machine and stuffed with the food emulsion. For example, where sausage and frankfurters are concerned the food emulsion would be comprised of emulsified meat together with fillers, seasoning, spices, etc. For such products, smaller size casing materials, for example, size codes 1 through 5½ are used. Links are normally formed from the continuous encased extruded product, with the links, for example, being twisted at the separations between them or tied at those separations. Then the links are separated from each other, for example, by cutting the separations between ties. In the case of large diameter food emulsion products, such as bologna, cheese, salami and the like, the food emulsion is introduced into large, heavy-walled fibrous type casings or casings formed from thermoplastic films which, with the food emulsion stuffed therein, are formed into chubs or rather lengthy individual sticks. These large diameter sausage products are filled on stuffing machines comprising a meat pump and a delivery attachment in the form of a stuffing horn. The ends of this large code casing material are sealed with clips or caps, frequently also including means for hanging the end product, such as, for example, a looped string or a hook device. The large food emulsion products, such as bologna, etc., are frequently used to produce multi-slice packaged consumer products, and the stuffed products are usually packed in large "code" casings which, in the trade, are designated, for examples, Code No. 6 through Code No. 9.

The smaller sizes of stuffed food emulsion products in individual pieces, e.g., links, are typically then packaged with a predetermined number of pieces going into each package. High speed, automated packaging equipment is used to handle, transport and package the individual pieces and to seal and label the packages when filled. For customer appeal, and to maintain precisely consistent weights, package for package, each piece must be the same size, have the same material consistency and be the same weight as each other piece.

Many of the large food emulsion stuffed products, on the other hand, are sliced and packaged into units of predetermined weight and slice count for retail sale. High speed slicing devices are used in conjunction with such consumer packaging operations, with the overall system being designed to produce uniform and consistent packages of sliced food products with a predetermined weight and count yield. Thus, a very important consideration in the production of both smaller and larger stuffed food emulsion products is that the encased product have a substantially uniform diameter and density of material therein.

In stuffing casings, a sizing and/or braking system is typically employed for controlling casing expansion so as to avoid exceeding the casing specification, establish by the manufacturer, regarding the recommended stuffing diameter. Also the use of the sizing and/or braking system can inhibit back purge of food emulsion. A brake device usually applies uniform pressure to the exterior wall of the unfilled casing as it is being pulled from the stuffing horn by the food emulsion which is extruded through the horn into the casing. A sizing device, on the other hand, usually imposes some restriction on the extruding food emulsion at the point of, or just following, the exit of the food emulsion from the stuffing horn; for example, a sizing device may function to cause the casing to stretch out to its full, unwrinkled diameter.

The distinction between a braking device and a sizing device tends to be a very gray area in the trade and in many cases the terms are used interchangeably. Both devices, no matter what particular terminology is used, are designed to apply some sort of frictional limitation, holding back the otherwise free movement of the casing, from its shirred form on the stuffing horn, onto the extruded food emulsion. If the casing is not restricted, the food emulsion which is extruded will not be consistently densified and may not completely expand and fill the casing. In many combined brake/sizing systems, the design is such that forces are applied uniformly and circumferentially to the outer casing wall, forcing it against the stuffing horn, thus, creating friction between the inner casing wall and the stuffing horn and, respectively, between the outer casing wall and the brake/sizing system.

The stuffing cycle typically begins with the operator loading the precut length of casing onto the stuffing horn. The first end of the casing, that end which is first to be filled with food emulsion and the end which is last to be slipped over the stuffing horn, typically has an end-closure. The end-closure may be formed from a gathering together of the end casing material with that gathering, typically, then being tied or clipped; there may also be a loop or tie string attached to the end-closure. The closed first end of the casing is brought flush with the outlet end of the horn. Then the horn and the brake/sizing system are aligned, usually axially, and the brake/sizing system assembly is fitted, sometimes forced, over the outer wall of the casing now on the horn, so that compressive forces are applied to the casing, pushing it against the horn at a point adjacent to the outlet end of the horn.

As mentioned previously, an important consideration, in the production of food emulsion products, is the maintenance of accurate diametrical and circumferential size control over the entire length of the stuffed food emulsion product. It is particularly important that the diameter of the large products be carefully controlled so that the packers are able to cut the chub or stick into slices of predetermined thickness and diameter for consumer packaging. The objective is to have a given number of slices weigh precisely a predetermined amount for each package. On the other hand, the smaller diameter products require not only diametrical control, but length control as well to enable the production of uniform pieces or links.

When a casing is understuffed from the recommended "green" diameter specified by the casing manufacturer, the result generally is a processed product that is not uniform in diameter from end to end and piece to piece. (The "green" product is the food emulsion product after stuffing but before further processing.) When understuffed, the product is undesirably wrinkled in appearance and the food emulsion product may have an emulsion brake down yielding undesirable pockets of fat or liquid. On the other hand, when a casing is overstuffed from the recommended green diameter, the casing may split or break apart at the stuffing station or subsequently, in transport to or in subsequent cooking or smoking processing operations. This results in a costly waste of food emulsion and the labor expense for clean up. Where smaller diameter products are being produced, overstuffing can result in inconsistent piece lengths, causing subsequent packaging problems.

A variety of differing arrangements of braking and sizing devices have been used in the food emulsion stuffing operations practiced by the food packaging industry. For example, U.S. Pat. No. 4,709,450 and U.S. Pat. No. 4,773,128 show automated equipment for stuffing food casings to provide dimensionally uniform products, including braking/sizing devices as shown in FIG. 6 of both references. Each of these references shows apparatus which is particularly adapted to the stuffing of large code casings, and both apply a resilient sizing ring to maintain pressure on the casing as it traverses the cylindrical portion of the stuffing horn. As shown in both FIGS. 6 and FIGS. 7 of both references, elaborate mechanical means are required to hold the sizing ring in position and to maintain the pressure of the sizing ring against the cylindrical portion of the stuffing horn. Although such means function to expectations, both include many areas into which dirt and contamination can find their way. These areas are difficult to clean, and to maintain as clean, during the operation of the food emulsion stuffing equipment, resulting in potential safety and health concerns. Various other designs of braking and sizing apparatus are also employed in the industry many of which have the same potential safety and health concerns. Thus there is a need in the industry for means which diminish and/or eliminate these concerns, providing reassurance to both the industry and official regulatory agencies that the end product can be essentially contamination free.

One form of casing that is used in the industry is known as a "shirred" casing wherein the casing material is longitudinally compressed back upon itself in an accordion fold manner. Each length of shirred casing, which may be extended to, for example a length of about 100 meters, is compressed into lengths which may extend in length to only 20 cm. This is particularly true with shirred casing sticks used in the production of frankfurters as well as smaller size link sausage products. For the large code casings, the extended length can be much shorter, often less than a meter in length, and the shirred length for such casings may only be a few centimeters in length. Such short casings are typically used where a single casing strand is used to make only one green encased food emulsion product piece. Examples of such are found in those sausage products which are classified as dry cased sausage, such as pepperoni, summer sausage, hard salami and the like.

The shirred casing sticks are often prepackaged to maintain them in a shirred condition and to make the shirred sticks capable of being readily sheathed onto the stuffing horns of food emulsion stuffing equipment. One example of such a packaged shirred casing is shown by U.S. Pat. No. 4,484,679. In this reference there is shown a shirred casing stick which is prepackaged in a wrap sleeve. The wrap sleeve is formed from a tubular plastic section into which the shirred casing stick is inserted. The ends of the wrap sleeve extend beyond the ends of the shirred casing stick. These extended wrap sleeve sections are heated to the point of relaxation and compressed against the ends of the shirred casing stick by mechanical plungers while the plastic wrap sleeve material is in a fluid state at the elevated temperature. Such heat formability of a variety of plastic materials are well known to those with skill in the field. The packaging taught in U.S. Pat. No. 4,484,679 is merely that, simply a packaging; it includes no means for accomplishing any function other than simply holding the shirred casing stick in form and in a shirred condition.

U.S. Pat. No. 4,422,215 shows another form of packaging for a shirred casing stick. In addition to wrapping the shirred casing stick in plastic, this reference shows the inclusion of a "calibrated ring" which is included in the packaging at the lead end of the shirred casing stick to enhance the ability of the stick to be fitted over the tubular form of the stuffing horn. In U.S. Pat. No. 4,422,215, as was true for U.S. Pat. No. 4,484,679, there is, apparently, no thought given to any means other than those which function to package the shirred casing and to provide for the capability of the package, with the shirred casing in it, to be readily fitted over the tubular form of the stuffing horn of food emulsion packing equipment.

U.S. Pat. No. 4,007,761 shows yet another form of packaging for shirred casing sticks, again using a plastic material to enclose the shirred stick and to maintain it in its shirred form. This reference, in addition, shows the inclusion of a sizing ring adjacent to the lead end of the shirred casing stick and encased in plastic within the package. In the arrangement shown in U.S. Pat. No. 4,007,761, as the casing stick is withdrawn from the package, being pushed by the extruding food emulsion product moving through the stuffing horn, the moving casing is expanded around the outside diameter of the sizing ring which is within the package. Thus, pressure and friction are imposed on the interior walls of the casing material, by distention of that casing material, as it is pulled off of the shirred stick. The sizing ring is maintained in place at the lead end of the shirred casing stick by the plastic packaging which surrounds both the shirred casing stick and that sizing ring. According to the design shown in U.S. Pat. No. 4,007,761, the packaging need not be removed to place the combination of the shirred stick and the sizing ring onto the stuffing horn of a food emulsion pump apparatus. The sizing ring of U.S. Pat. No. 4,007,761 serves to expand the casing material to its full diameter, smoothing out the wrinkles therein, but provides relatively little regulation and restraint in regard to the rate at which the casing material may be pulled from the package. Thus, there is a concern that voids may be included in the food emulsion, which is extruded into such a casing, and that the consistency of the material extruded into that casing will not have sufficiently uniform density to provide the uniform weight which is necessary for both link and sliced products as described above.

The packaging described in U.S. Pat. No. 4,007,761 is a definite step in the right direction as it provides a package, with some means for sizing the casing material, which does not include the elaborate and complicated mechanical equipment as shown in U.S. Pat. No.

4,709,450 and U.S. Pat. No. 4,773,128. Thus the concern for contamination and build up of dirt is largely eliminated by this package. However, packaging is needed wherein sufficient frictional restraint can be readily imposed preferably on the exterior of the casing material as it is being pulled from the shirred casing stick, but without need for elaborate mechanical means for holding such a braking means in place or applying regulatory pressure to the braking means. An added advantage would be the inclusion of an integrated and simplified means for sizing the product being extruded.

As will be noted in U.S. Pat. No. 4,007,716, a clip or some other closure means, is used to form the end-closure of the lead end of the shirred casing stick. A variety of different plastic and/or metal clips are commonly used in the food emulsion packaging industry, variously with and without some sort of device, such as a string or a hook, to be utilized for hanging the sausage product. Such means for hanging the sausage may be necessary, for example, in the case where the sausage material is further processed, such as in the smoking operation and/or in further seasoning or aging processes as are frequently employed in the production of various types of stuffed food emulsion products. In particular, for dry cased sausage products, the casing material is usually moisture permeable and the products must be hung for some period of time to permit the gradual and slow escape of moisture from the package.

BRIEF SUMMARY OF THE INVENTION

A first aspect of the present invention is a packaged shirred food emulsion casing stick comprising, firstly, a length of shirred food emulsion casing having an end-closure formed therein; the end-closure has incorporated with it a hanger means which provides means by which the end product can be hung. The length of shirred casing is packaged within a tube, which may be plastic or other material, such as, for example, a biodegradable organic material. The tube has integral means which are operable in conjunction with a food emulsion stuffing horn to apply frictional pressure, at an oblique angle, to the food emulsion casing as it is being drawn from within the plastic tube by the food emulsion extrusion being pumped through the stuffing horn. The tube also includes, in combination with the means for applying frictional pressure, means for also controlling the size of the encased food emulsion green stick as it is being formed. In addition, there are included means for relieving the build-up of gas pressure from within the casing; the build-up of gas pressure is typically caused by the food emulsion extrusion filling the previously empty casing. This means for relieving the build-up of gas pressure is incorporated into the tube.

A second aspect of the present invention is a method of producing the packaged shirred food emulsion casing stick of the first aspect, above, of the present invention. This comprises, firstly, forming a length of shirred food emulsion casing stick, then secondly, forming an end-closure in that length of casing stick. Then the end-closure is inverted into the bore of the length of shirred food emulsion casing stick, after the formation of the end-closure has been completed. The reason for this sequence is that it is believed a stronger and tighter end-closure is formed if it is formed at a position where it is most facile to directly access it to enable and enhance the formation of that end-closure, i.e., before it is inverted into the bore. Then the length of shirred food emulsion casing stick is inserted into the tube, the same tube which is described above in regard to the first aspect of the present invention. After the length of shirred food emulsion casing stick has been inserted into the tube, means are formed into that tube for relieving the build-up of gas pressure in the casing during extrusion.

A third aspect of the present invention is the encased extruded food emulsion product which is produced by extruding food emulsion through the stuffing horn of food emulsion extruding equipment into a length of shirred food emulsion casing drawn, by the extruding food emulsion, from a packaged shirred food emulsion casing stick, as described above in regard to the first aspect of the present invention, that packaged casing stick which had been fitted onto the stuffing horn.

The present invention, more specifically, comprises shirred casing sticks packaged into a tube of preferably heat formable material adapted to permit the casing stick to be slid or sheathed over the stuffing horn of a food emulsion packing system. The packaging material is also adapted to provide a means for sizing/braking the withdrawal of the casing from the stuffing horn on which it is fitted to be filled by food emulsion extrusion. The braking/sizing function applies frictional pressure to the casing as it traverses the lead edge of the food emulsion stuffing horn, the force being applied at an oblique angle to both the axis of the stuffing horn as well as the axis of the shirred casing stick.

Also included in the combination of the present invention is a hanger means which forms the end-closure of the shirred casing stick of the present invention. The hanger means is formed preferably of a plastic material which is preferably perforated in a star pattern permitting the ready insertion of a rod therethrough. The hanger means has a sure grip means at the end thereof, where the lead end of the food emulsion casing is attached thereto, such that a clip or a ring positively, uniformly and neatly completes the attachment of that lead end of the casing to the hanger means. The hanger means features completely rounded and smooth surfaces, and it requires no insertion or perforation through the casing material to form the end-closure; there are no rough edges associated with the hanger means to potentially cause tears or holes in the food emulsion casing (which can result in blow outs of the food emulsion product extruded into the casing).

In producing the combination of the present invention, a shirred casing is formed in a conventional manner. To the shirred casing is attached the hanger means by way of the clip or a ring as described above. A hollow, cylindrical tool, similar in size and shape to the food emulsion stuffing horn onto which the casing ultimately will be mounted, is preferably used to invert the end-closure of the casing back into the bore of the shirred stick. The shirred casing, with an end-closure thus formed, is inserted into a cup means, preferably heat formable, and the end of that cup means, which is remote from that end of the shirred casing stick which contains the end-closure, is preferably heat sealed such that a perforation is formed which is slightly larger than the bore of the shirred casing stick. The end of the cup means, which is adjacent to that end of the casing stick which contains the end-closure, is formed on an oblique angle with an aperture therethrough, that aperture which is slightly smaller in diameter than the bore of the shirred casing stick.

In use, the package is inserted over the stuffing horn of the food emulsion system with the end of that stuffing horn making direct contact with the interior of that end-closure of the shirred casing stick which had been inverted into the bore of the shirred casing stick. The end of the stuffing horn serves to push the end-closure out to the lead end of the shirred casing stick and into contact with the inner surface of the oblique angle portion of the cup means. Means for applying longitudinal pressure, coaxially aligned with the cup means, the shirred casing stick and the stuffing horn, are used to apply pressure to the outer surface of the oblique angle portion of the cup means, forcing it longitudinally toward the end of the stuffing horn such that frictional pressure is applied to the casing material as it is drawn through the aperture in the oblique angle portion of the cup means, as the end-closure and the balance of the casing is pushed forward from the end of the stuffing horn by the extrusion of the food emulsion therethrough into the casing. Because of the frictional pressure applied to the casing, the casing is tautly drawn against the extruding food emulsion which tends to compress somewhat and slightly build up pressure (sufficient to overcome the friction) and, thus move the casing past the means for sizing/braking to completely and uniformly fill the casing, thereby eliminating any voids, air pockets, etc. which may degrade the product. In addition, because of the pressure applied to the casing, the consistency of the density of the extruded food emulsion product is maintained throughout the full length of that product.

Another aspect of the present invention includes an easy load carton adapted to be fitted to the magazine apparatus of automated or semi-automated food emulsion stuffing equipment. The easy load carton features a pull-out tray adapted to both maintain the alignment of the packaged shirred casing sticks and to facilitate the loading thereof onto stuffing horns.

DETAILED DESCRIPTION OF THE INVENTION

Figure 1:
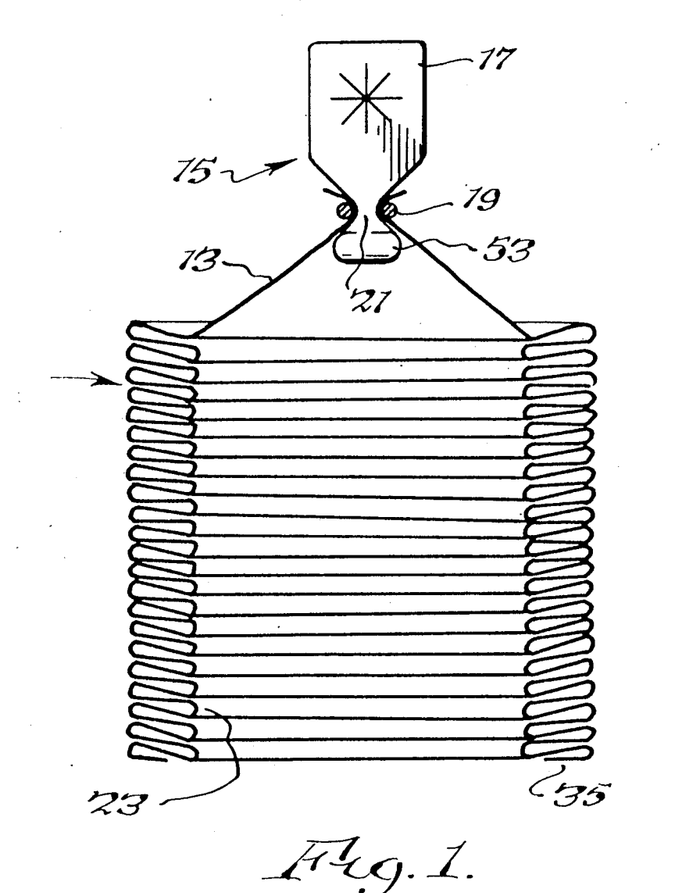
FIG. 1 is a cut-away semi-schematic elevational view of a section of shirred food emulsion casing including the end-closure formed by the hanger means as surrounded with the clip means.
Figure 7:
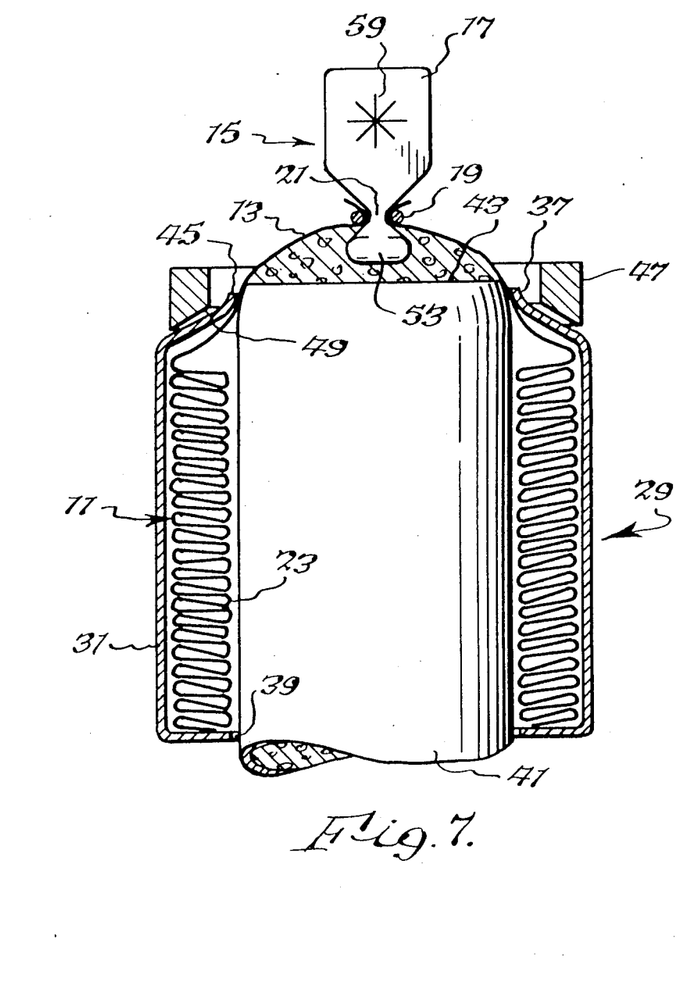
FIG. 7 shows the same view as that shown in FIG. 5 but with pressure being applied against the oblique angle portion of the cup means forcing it into contact with and over the lead end of the stuffing horn, with the casing material compressed between the oblique angle portion of the cup means and the lead end of the stuffing horn.
Figure 8:
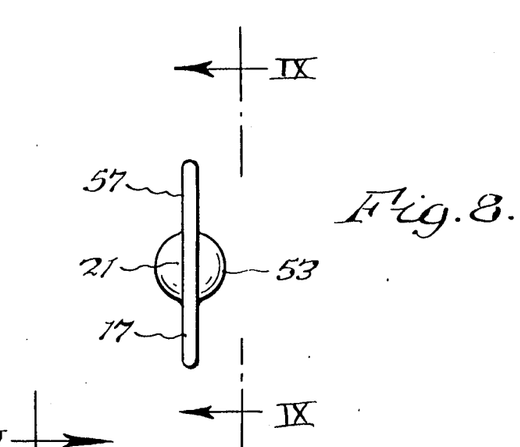
FIG. 8 shows an end view of the hanger means.

Referring to FIG. 1 there is shown a shirred casing stick 11 which may be formed from any one of a variety of materials which are used in conventional food emulsion casing. At one end of the shirred casing stick, an end-closure 13 is formed. The end-closure 13 is sealed and held together by clamp means 15. Clamp means 15 preferably comprises hanger 17 and clip ring 19. Additional views of hanger 17 are shown in FIGS. 7 and 8 and will be further explained and described hereinafter. Clip ring 19 is preferably formed from a cylindrical section of formable material, for example, a heavy gauge metal wire or a deformable plastic. The cylindrical section of clip ring 19 is longitudinally formed into a circumferential section with the two opposed ends of the foremost cylindrical section being in a relationship approaching abutment with each other; the two opposed ends may, for example, have a slight gap therebetween or, for example, they may overlap, or they may actually abut, face-to-face. The surface of clip ring 19 is preferably smooth with no roughness and with no sharp edges.

The clamp means 15 is formed by gathering a portion of the casing material, used to form the shirred casing stick 11, around the neck 21 of hanger 17. The two ends of clip ring 19 which will ultimately relate to each other, approaching abutment, are spread apart and placed in position to surround the casing material gathered around the neck 21 of hanger 17. Then those two ends of clip ring 19 are urged towards each other, for example, by the resilient properties of the material used to form clip ring 19 or by external force, towards the abutting position, thus firmly sealing the interior of casing material to the neck 21 of hanger 17, with the exterior of that casing material being sealed against the inner circumference of clip ring 19; thus, clamp means 15 is formed resulting in the production and maintenance of end-closure 13.

Figure 2:
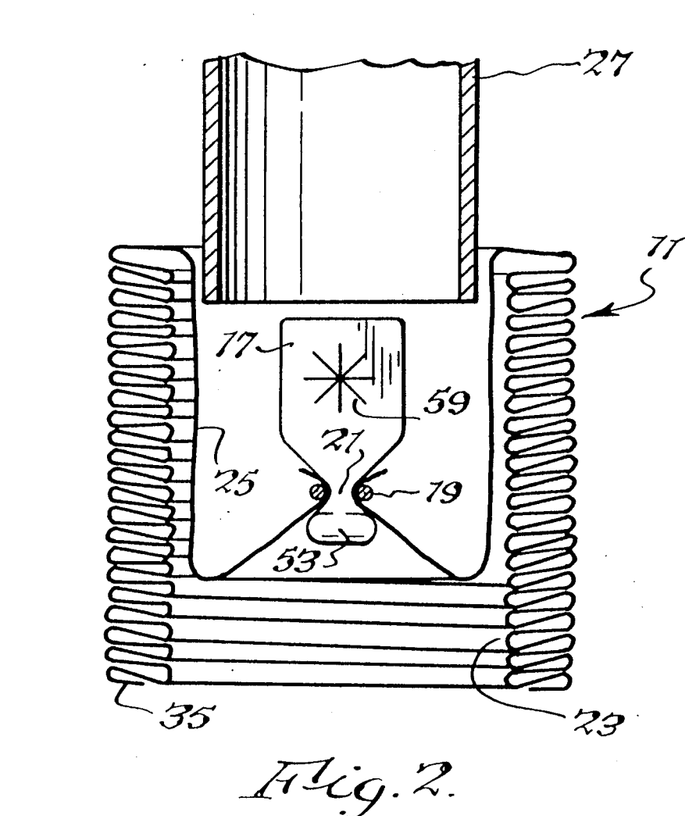
FIG. 2 is a similar view to that as shown in FIG. 1 except that the end-closure has been inverted to fit within the bore of the shirred casing stick.

As shown in FIG. 2, end-closure 13, including clamp means 15, is inserted into the inner bore 23 of shirred casing stick 11. The insertion of end-closure 13 into inner bore 23 of shirred casing stick 11 results in the inversion of a portion of the casing material into inner bore 23 as shown in FIG. 2. This inverted section 25 is preferably sufficient in length to permit the insertion of substantially all of clamp means 15 and end-closure 13 into that inner bore 23 of shirred casing stick 11 as is shown in FIG. 2. The insertion of end-closure 13 into the inner bore 23 of shirred casing stick 11 is preferably accomplished by a tubular section, for example, a section of pipe 27 which is simply axially extended against the casing material portion of end-closure 13, thus pushing it into the inner bore 23 of shirred casing stick 11. The hollow bore of pipe section 27 provides clearance for clamp means 15 while longitudinal extension of the end of pipe section 27 produces a uniform insertion of end-closure 13 into inner bore 23.

Figure 3:
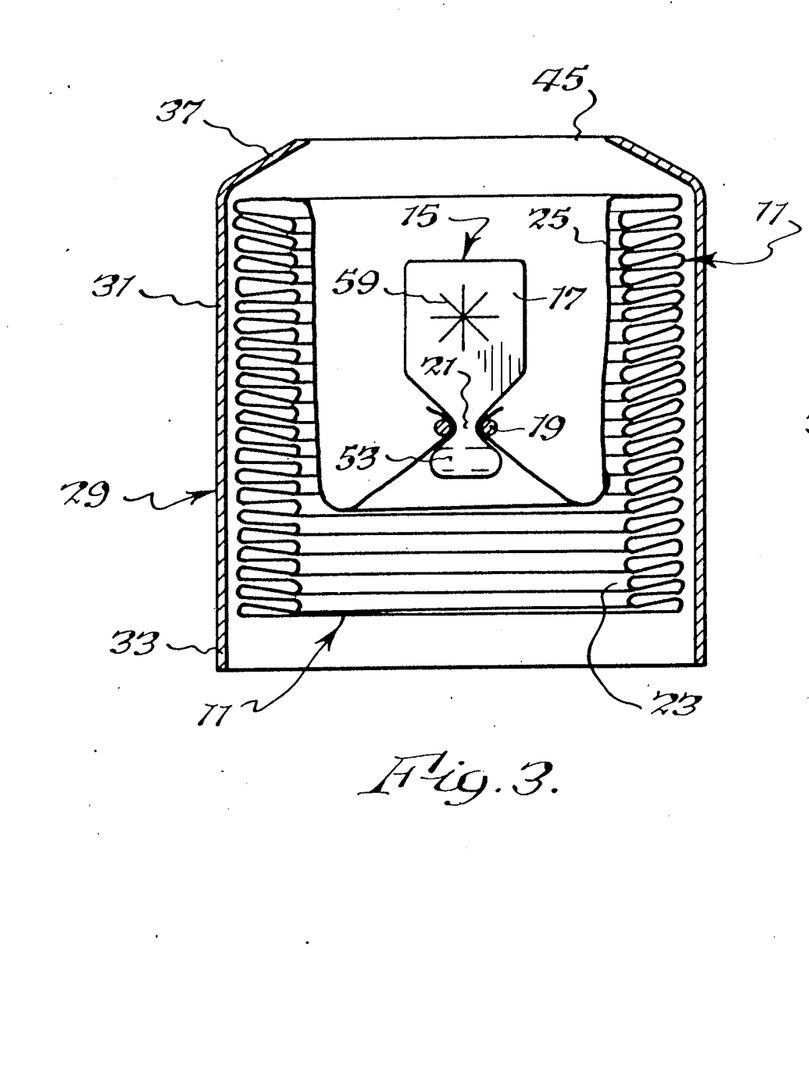
FIG. 3 shows the same view as shown in FIG. 2 with the addition of a cut-away elevational view of the cup means as inserted over the shirred casing stick, but before heat closure of that end of the shirred casing stick, which is remote from the end-closure.

Referring to FIG. 3, shirred casing stick 11, with end-closure 13 inserted into inner bore 23 as shown in FIG. 2, is inserted into cup 29. Cup 29 is preferably formed from a heat formable plastic material which, at ambient temperatures, is resilient; for example, a polyvinyl chloride material may be used. Alternately, the material of cup 29 could be a biodegradable material which is not plastic, but rather which may be either organic or inorganic in predominant chemistry. Cup 29 includes hollow cylindrical section 31 which, in diameter, is sized such that shirred casing stick 11 may readily be inserted thereinto as shown in FIG. 3.

Cup 29 is preferably a preformed item, the preform of which is generally about as shown in cross section in FIG. 3. Hollow cylindrical section 31 of the preform is sufficiently long enough to include an extension section 33 of hollow cylindrical section 31. Extension section 33 extends beyond the length of shirred casing stick 11 as is also shown in FIG. 3. The length of extension section 33 is about equivalent to the thickness of wall section 35 of shirred casing stick 11. However, it is preferred that the length of extension section 33 is slightly less than the thickness of wall section 35, the reason for which will become apparent hereinafter.

At the opposite end of cup 29 from extension section 33 is brake/size lip 37 which is generally in the form of a truncated hollow conical section, the largest diameter of which is equivalent to the diameter of hollow cylindrical section 31 and the inner diameter of which is somewhat smaller than the diameter of inner bore 23 of shirred casing stick 11 as will be hereinafter explained. The angle of the surfaces of brake/size lip 37 is oblique to the axis of cup 29.

Figure 4:
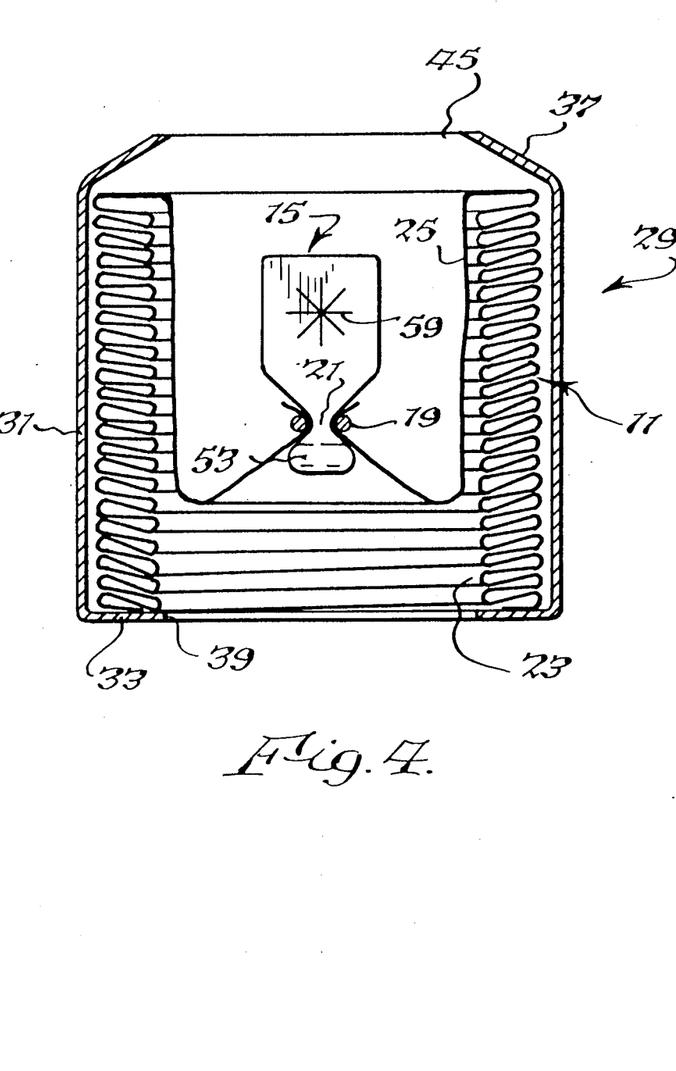
FIG. 4 shows the shirred casing stick of the present invention fully encased in the cup means ready for insertion onto the stuffing horn of a food emulsion extrusion system.

As mentioned previously shirred casing stick 11 is inserted into the form of cup 29, as has just been described referring to FIG. 3. Extension section 33 is then heat formed to extend radially inwardly, preferably at about a 90° angle from the axis of hollow cylindrical section 31, with the end thereof forming cup bore 39 as shown in FIG. 4. Cup bore 39 is nominally equivalent to or slightly larger in diameter than inner bore 23 of shirred casing stick 11. The reality is that there is and may be some variation in the size of cup bore 39 resulting from some small but tolerable variations in the manufacturing processes. The function of extension section 33, when formed as just described, is simply to hold shirred casing stick 11 within cup 29 and to provide a protective package section such that rapid insertion of the combination shown in FIG. 4, onto the stuffing horn of food emulsion stuffing equipment, will not damage the casing material of shirred casing stick 11. The means of heat forming extension section 33 are not part of this invention and any of several different means for making such type of formation, as are well known to those with skill in the art, may be employed. For example one such method, which might be readily adapted to form extension section 33 into cup bore 39, is described in U.S. Pat. No. 4,484,679, a reference which is discussed above.

Figure 5:
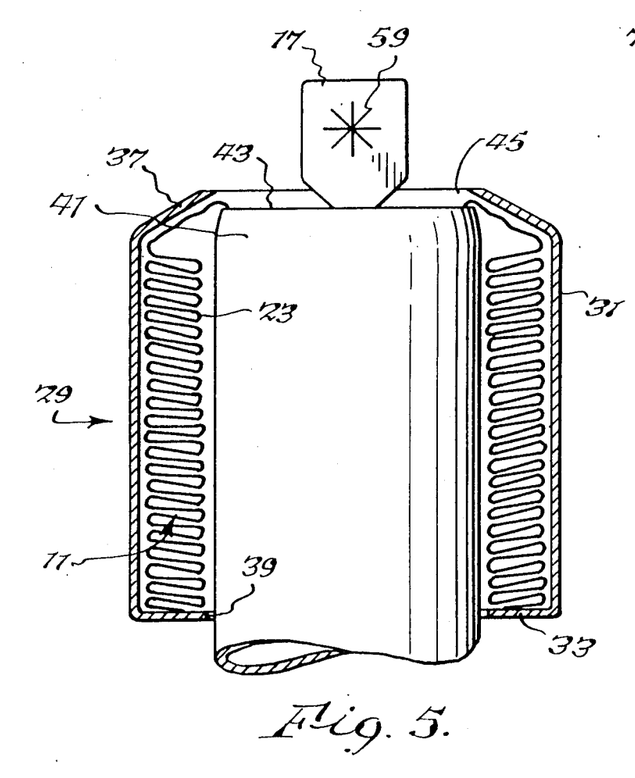
FIG. 5 shows the combination of the present invention as inserted over the stuffing horn of a food emulsion system.

Referring to FIG. 5, the packaged shirred casing stick of FIG. 4, as packaged in cup 29, is shown with food emulsion stuffing horn 41 inserted through cup bore 39 and engaged with end-closure 13 such that end-closure 13 (which cannot be entirely seen in FIG. 5) is positioned somewhat within stuffing horn 41. As is shown in FIG. 5, hanger 17 is partially exposed above the lead end 43 of stuffing horn 41. As stuffing horn 41 is inserted into the inner bore 23 of shirred casing stick 11, through cup bore 39, inverted section 25 substantially becomes inserted into the hollow interior of stuffing horn 41 provided that stuffing horn 41 is not already substantially full of food emulsion from the extrusion filling of previous casings. At any rate, whether stuffing horn 41 is filled or empty the arrangement of inverted section 25 is such that, to the greatest extent possible, the opportunity for entrapment of air and other gases is substantially reduced. If stuffing horn 41 is filled with food emulsion extrusion, the interior of the casing material of shirred casing stick 11, which is part of inverted section 25 and end-closure 13, will come into direct contact with that extruded emulsion material within stuffing horn 41, with air and gas, that otherwise might be entrapped, escaping along the open area between the exterior of stuffing horn 41 and the inner bore 23 of shirred casing stick 11, then through cup bore 39. Thus, it is significant to insure that cup bore 39 does not have a gas tight or air tight fit to the exterior of stuffing horn 41. Thus, the diameter of cup bore 39, although it may be nominally equivalent to the outside diameter of that portion of stuffing horn 41 onto which cup bore 38 is fitted, the actual diameter of cup bore 39 should be at least slightly larger in diameter. In the event that stuffing horn 41 is empty, with the placement of inverted section 25 and end-closure 13 within the interior of stuffing horn 41, as the food emulsion material is extruded into and toward the lead end 43 of stuffing horn 41, the air and gases which are displaced, likewise, are expelled from lead end 43 of stuffing horn 41, through that open area between the exterior of stuffing horn 41 and inner bore 23 of shirred casing stick 11, and through cup bore 39.

Figure 6:
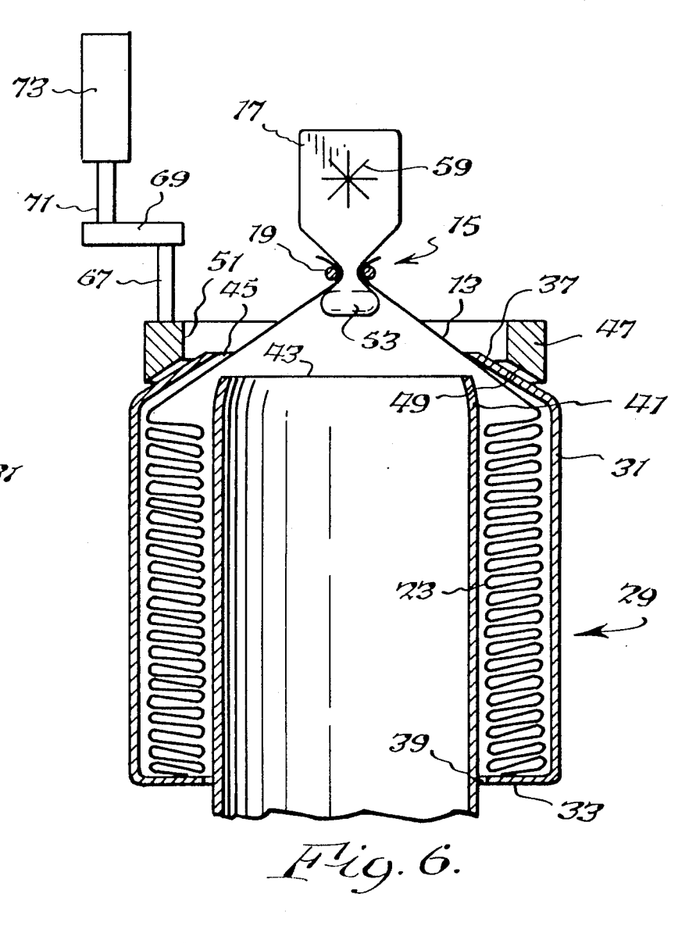
FIG. 6 shows the same view as that shown in FIG. 5 with the addition of means for applying pressure against the oblique angle portion of the cup means.

Referring to FIG. 6, as food emulsion product is extruded through stuffing horn 41, it pushes end-closure 13 out of stuffing horn 41, past the lead end 43 thereof, and through brake/size aperture 45 which forms the smallest diameter of brake/size lip 37. At this point, axially directed pressure is applied by pressure ring 47 against the exterior of brake/size lip 37 which, being made of a resilient material, is forced axially to engage the lead end 43 of stuffing horn 41 such that the casing material of shirred casing stick 11 is frictionally compressed therebetween. Brake/size aperture 45 is smaller in diameter than lead end 43 of stuffing horn 41 such that the casing material extending from shirred casing stick 11, after it passes the frictional compression caused by brake/size lip 37 being flexed to engage stuffing horn 41, must now traverse through brake/size aperture 45 which is sized to maintain a uniform desired diameter for the food emulsion product which is being extruded. Brake/size aperture 45 is adjustable, within a limited range, by the application of varying degrees of axial pressure onto brake/size lip 37 by pressure ring 47.

It will be noted that lead end 43 of stuffing horn 41 is slightly tapered, or alternatively takes the form of a truncated hemisphere, but not to the extent of the truncated conical section of brake/size lip 37. Pressure ring 47 has, on the other hand, at its pressure face 49, an angled face adapted to generally meet with the oblique angle included in the conical section of brake/size lip 37. Pressure ring 47 may be somewhat resilient being comprised of, for example, a material such as hard rubber or a relatively high durometer synthetic elastomer.

The diameter of pressure ring aperture 51 which extends through pressure ring 47 is sized to be larger than the outside diameter of stuffing horn 41 such that the location of the pressure that is directly applied to brake/size lip 37 is applied at a point thereon which is sufficiently spaced apart from the exterior of the lead end 43 of stuffing horn 41, and is resiliently bendable, such that the portion of brake/size lip 37, which is engaging stuffing horn 41, pressure deforms into a flare pattern, applying imposing pressure to the casing material therebetween as shown in FIG. 7. The degree of bend and flaring which is imposed to that section of brake/size lip 37 will tend to alter the diameter of brake/size aperture 45, thus providing a variable degree of control to the size of the encased food emulsion product which is being extruded through stuffing horn 41 and being encased by the casing material from shirred casing stick 11. Thus, the combination of pressure ring 47, brake/size lip 37 and the lead end 43 of stuffing horn 41, as shown in FIG. 7, provide both a brake to the casing material, being drawn from shirred casing stick 11 by the extruding food emulsion product, and also a means for controlling the diameter of that encased food emulsion product, i.e., a sizing means.

The pressure that is applied by pressure ring 47 is the result of force being applied to pressure ring 47 by any of a variety of different easily envisioned means which will be quite familiar to those with skill in the art. For example, as shown in FIG. 6, pressure ring 47 might be mounted by an extensor 67 to an arm 69 which is, itself, pivotally mounted 71 to a hydraulic cylinder 73; the arm 69 and pressure ring 47 could be pivoted out of the way for ease of loading the packaged shirred casing stick 11, as shown in FIG. 4, while the hydraulic cylinder 73 could be readily engaged to move pressure ring 47 towards brake/size lip 37. Alternately, for example, mechanical screw means of any variety of different types might be employed; for example, adaptation of the present invention could readily be made to the apparatus shown in FIG. 6 and 7 of U.S. Pat. No. 4,709,450 and 4,773,128 to substantially simplify the mechanisms which are shown in those reference drawing figures.

Figure 9:
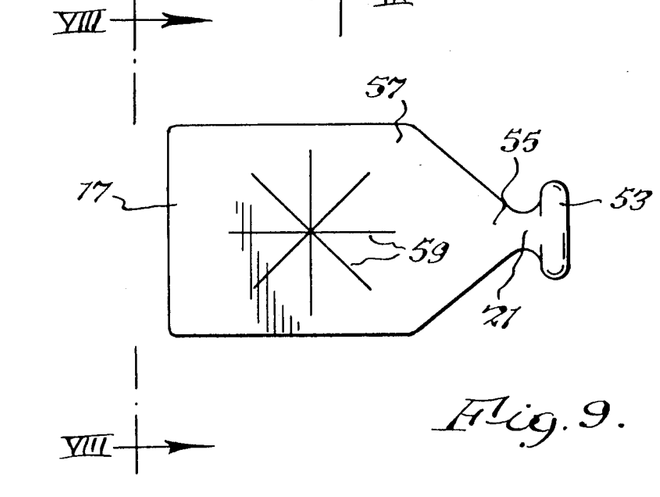
FIG. 9 shows a side view of the hanger means.

Referring to FIG. 8, there is shown an end view of hanger 17. View IX—IX of FIG. 8 is a side view of the hanger 17 as shown in FIG. 9. Correspondingly, view VIII—VIII of FIG. 9 is the end view of hanger 17 shown in FIG. 8. Referring to FIGS. 8 and 9, hanger flange 43 is shown as being in the form, generally, of a doughnut without the hole. Extending from hanger flange 53 is neck 21 which is hour-glass in form, having at the end thereof transition 55 from a round hour glass form to a flat form, which is tab 57. About centrally located in the flat section of tab 57 is means for hanging, shown in the shape of a star formed of a series of intersecting slits 59 through which a rigid member can be poked, thus opening up an aperture from which hanger 17, and the encased food emulsion product as well, may be hung. Slits 59 are effectively perforations substantially through the thickness of tab 57 of hanger 17.

Figure 10:
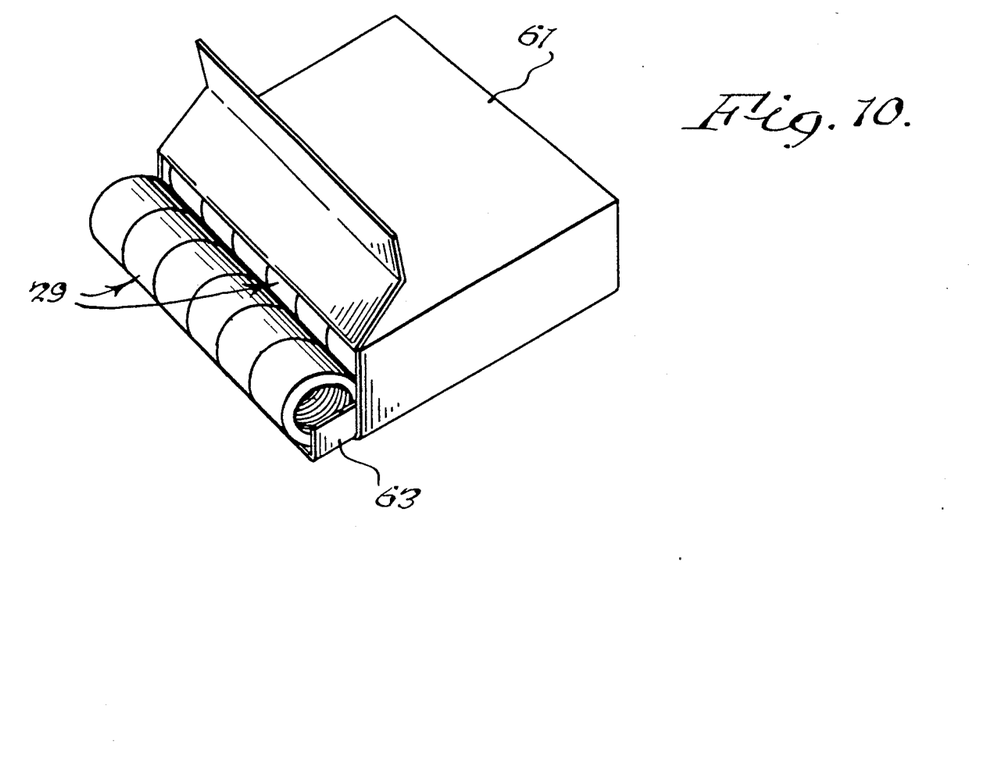
FIG. 10 shows the carton packaging of the present invention as would be delivered to the food emulsion packing industry.
Figure 11:
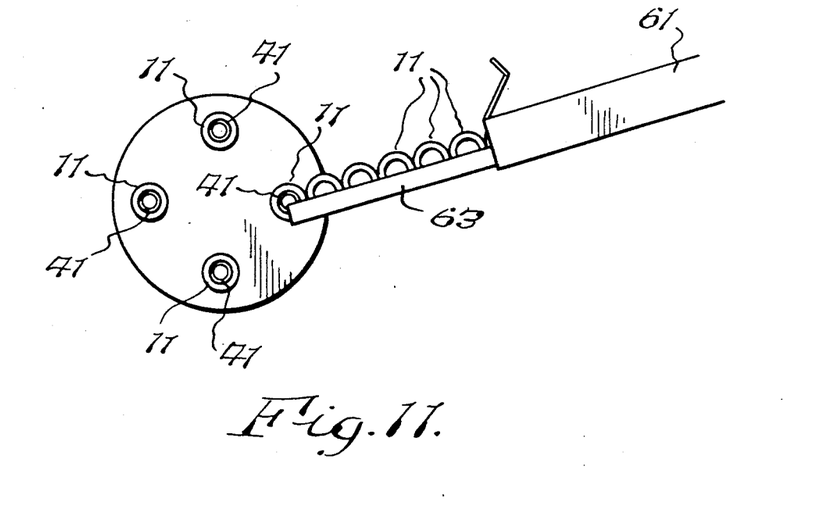
FIG. 11 shows the arrangement of the carton in FIG. 9 fully opened up and positioned for ready insertion of the package of the present invention, as shown in FIG. 4, over the stuffing horns of a four-turret stuffing machine.

FIG. 10 shows a convenient carton 61 shaped and sized such that multiples of packaged shirred casing sticks, as shown in FIG. 4, may be aligned therein such that when the carton 61 is set in place in the magazine apparatus of the automated or semi-automated food emulsion stuffing equipment, as is shown in FIG. 11, then each row of packaged shirred casing sticks is axially aligned with the stuffing horn onto which they are to be loaded. Each row, of packaged shirred casing sticks, includes a plurality of those sticks, all coaxially aligned. Carton 61 includes pull tray 63 which may be pulled out with the plurality of packaged shirred casing sticks as is shown in FIG. 11. Pull tray 63 is adapted such that each of the packaged shirred casing sticks as shown in FIG. 4 may readily be fitted onto the stuffing horn, or multiplicity of horns, of a food emulsion stuffing system.

In FIG. 11 there is shown a turret 65 with four stuffing horns 41 located thereon. Onto each stuffing horn 41, as shown in FIG. 11, there is fitted a shirred casing stick 11. Carton 61 and pull tray 63 are sized to readily fit to and be adapted to the already existing, more or less standard size, loading magazine means used in conjunction with several varieties of automated or semi-automated food emulsion stuffing equipment presently in use, as are well known to those with skill in the art.

Although the invention has been described in considerable detail with respect to the preferred embodiments thereof it will be apparent that the invention is capable of numerous modifications and variations to those skilled in the art, without departing from the spirit and scope of the invention as defined in the appended claims which are hereby included by this reference in this specification.

What is claimed is:

1. A packaged shirred food emulsion casing stick comprising:
   a) a length of shirred food emulsion casing having an end-closure formed therein, said end-closure which includes, incorporated therewith, a hanger means;
   b) a plastic tube within which said length of said casing is packaged;
   c) said plastic tube which includes integrated therewith means, operable in conjunction with a food emulsion stuffing horn, for applying frictional pressure, at an oblique angle, to said food emulsion casing as said food emulsion casing is drawn from said plastic tube by the extrusion of food emulsion through said stuffing horn;
   d) said plastic tube which includes, in combination with said means for applying frictional pressure, means for controlling the diametrical size of the food emulsion product which results from the stuffing by extrusion of said food emulsion into said casing; and
   e) means for relieving the build-up of gas pressure in said casing as said food emulsion is being extruded into said casing, said means for relieving which are incorporated into said plastic tube.

2. The invention of claim 1 wherein said plastic tube comprises a cup means which, has integrated therewith, before packaging said length of said casing therewith:
   a) said means for applying frictional pressure; and
   b) said means for controlling said diametrical size.

3. The invention of claim 1 wherein the plastic material of said plastic tube is heat formable.

4. The invention of claim 2 wherein cup means is formed from a heat formable plastic material.

5. The invention of claim 4 wherein said means for reliving said build-up of said gas pressure is heat formed from said plastic material after said length of said casing is packaged within said cup means.

6. The invention of claim 5 wherein said means for relieving said build-up of said gas pressure comprise a radially inwardly extending end section of said cup means, remote from said means for applying frictional pressure, said end section which contains an aperture larger in diameter than the outside diameter of that portion of said stuffing horn, onto which said end section is to be fitted.

7. The invention of claim 2 wherein said means for applying frictional pressure comprise brake/size means in the form of a truncated hollow conical section, extending inwardly from the body of said cup means at an angle oblique to the axis of said casing packaged within said cup, said brake/size means including an aperture smaller in diameter than the greatest outside diameter of said stuffing horn.

8. The invention of claim 7 wherein said brake/size means also function to control said diametrical size of said food emulsion product.

9. The invention of claim 1 wherein said hanger means is formed of a plastic material and comprise:
   a) a hanger flange;
   b) an hour-glass shaped neck coaxially extending form said hanger flange;
   c) a transition section from said neck to a flat form; and
   d) tab means, in the shape of a flat form, mounted to said neck by said transition section, said tab means having a star perforation centrally located through said flat form of said tab means.

10. The invention of claim 1 further comprising pivotally movable means for applying linear force coaxially to said means for applying frictional pressure, said food emulsion casing and the lead end of said stuffing horn.

11. A method of producing a packaged shirred food emulsion casing stick comprising:
   a) forming a length of shirred food emulsion casing;
   b) forming an end-closure in said length of said shirred food emulsion casing;
   c) inverting said end-closure into the bore of said length of said shirred food emulsion casing;
   d) inserting said length of said shirred food emulsion casing into a plastic tube;
   e) said plastic tube which includes integrated therewith means, operable in conjunction with a food emulsion stuffing horn, for applying frictional pressure at an oblique angle to said food emulsion casing as said food emulsion casing is drawn from said plastic tube by the extrusion of food emulsion through said stuffing horn;
   f) said plastic tube which includes, in combination with said means for applying frictional pressure, means for controlling the diametrical size of the food emulsion product which results from the stuffing by extrusion of said food emulsion into said casing; and
   g) forming, into said plastic tube means for relieving said build-up of gas pressure in said casing as said food emulsion is being extruded into said casing.

12. The invention of claim 11 wherein said forming of an end-closure in said length of said shirred food emulsion casing comprises:
   a) gathering the lead end portion of said casing around a neck of a hanger means; and
   b) surrounding said neck of said hanger means, and said lead end portion of said casing with a clip ring to firmly seal the interior of said lead end portion of said casing to said neck of said hanger means.

13. The invention of claim 11 wherein said inverting of said end-closure into said bore of said length of said shirred food emulsion casing comprises axially extending a tubular section member against said end-closure and thereby pushing said end-closure into said bore.

14. The invention of claim 11 wherein said forming of said means for relieving the build-up of gas comprises heating that end of said plastic tube, which is remote from said means for applying frictional pressure, and deforming said end to radially extend inwardly to form an aperture at least as large in diameter as the greatest outside diameter of said stuffing horn.

15. The invention of claim 12 wherein said hanger means comprises:
   a) a hanger flange;
   b) an hour-glass shaped neck coaxially extending from said hanger flange;
   c) a transition section from said neck to a flat form; and
   d) tab means in the shape of a flat form, mounted to said neck by said transition section, said tab means having a star perforation centrally located through said flat form of said tab means.

16. The invention of claim 11 wherein said plastic tube comprises a cup means having integrated therewith:
   a) said means for applying frictional pressure; and
   b) said means for controlling said diametrical size.

17. The invention of claim 16 wherein said cup means is formed from a heat deformable plastic material and said means for applying frictional pressure and said means for controlling said diametrical size are formed in an end of said cup means before said length of said shirred food emulsion casing is inserted into said cup means.

18. A stuffed encased extruded food emulsion product produced by extruding food emulsion through the stuffing horn, of food emulsion extruding apparatus, into a length of shirred food emulsion casing drawn, by the extruding food emulsion, from a packaged shirred food emulsion casing stick fitted onto said stuffing horn, said packaged shirred food emulsion casing stick comprising:
   a) a length of shirred food emulsion casing having an end-closure formed therein, said end-closure which includes, incorporated therewith, a hanger means;
   b) a plastic tube within which said length of said casing is packaged;
   c) said plastic tube which includes integrated therewith means, operable in conjunction with a food emulsion stuffing horn, for applying frictional pressure, at an oblique angle, to said food emulsion casing as said food emulsion casing is drawn from said plastic tube by the extrusion of food emulsion through said stuffing horn;
   d) said plastic tube which includes, in combination, with said means for applying frictional pressure, means for controlling the diametrical size of said food emulsion product as such food emulsion is being stuffed by extrusion into said casing;
   e) means for relieving the build-up of gas pressure in said casing as said food emulsion is being extruded into said casing, said means for relieving which are incorporated into said plastic tube.

19. The invention of claim 18 wherein said stuffed encased food emulsion product is extruded by a method comprising:
   a) applying frictional pressure, at an oblique angle, to said food emulsion casing as said food emulsion casing is drawn from said plastic tube by the extrusion of food emulsion through said stuffing horn;
   b) controlling the diametrical size of said food emulsion product as said food emulsion is being extruded into said casing; and
   c) relieving the build-up of gas pressure in said casing as said food emulsion is extruded into said casing.

20. The invention of claim 18 wherein said hanger means comprises:
a) a hanger flange;
b) an hour-glass shaped neck coaxially extending from said hanger flange;
c) a transition section from said neck to a flat form; and
d) tab means, in the shape of a flat form, mounted to said neck by said transition section, said tab means having a star perforation centrally located through said flat form of said tab means.

* * * * *